(12) United States Patent
Ito (10) Patent No.: US 7,550,888 B2
(45) Date of Patent: Jun. 23, 2009

(54) BLOWER MOTOR FOR VEHICLE AIR CONDITIONING SYSTEM

(75) Inventor: Toshimoto Ito, Toyohashi (JP)

(73) Assignee: ASMO Co., Ltd., Shizuoka-pref (JP)

( * ) Notice: Subject to any disclaimer, the term of this patent is extended or adjusted under 35 U.S.C. 154(b) by 0 days.

(21) Appl. No.: 11/826,067

(22) Filed: Jul. 12, 2007

(65) Prior Publication Data

US 2008/0024025 A1    Jan. 31, 2008

(30) Foreign Application Priority Data

Jul. 31, 2006    (JP)    ............... 2006-208093

(51) Int. Cl.
H02K 5/00 (2006.01)
(52) U.S. Cl. .......................... 310/91; 310/89
(58) Field of Classification Search ............ 310/91, 310/89, 51
See application file for complete search history.

(56) References Cited

U.S. PATENT DOCUMENTS 2,560,784 A  *  7/1951  Sears ..................... 310/227
5,786,647 A  *  7/1998  Vollmer et al. ............. 310/89
2004/0169428 A1 *  9/2004  Sano et al. ................ 310/89

FOREIGN PATENT DOCUMENTS

| JP | A-2000-341898 | 12/2000 |
| JP | A-2003-088039 | 3/2003 |
| JP | A-2005-073322 | 3/2005 |

* cited by examiner

Primary Examiner—Nguyen N Hanh
(74) Attorney, Agent, or Firm—Posz Law Group, PLC (57) ABSTRACT

A motor holder receives a motor main body and includes a plurality of ribs, which are provided to an inner peripheral surface of the motor holder and are engaged with an outer peripheral surface of a motor yoke to hold the motor main body. The ribs are arranged symmetrically about a reference line, which is perpendicular to a rotational axis of a rotatable shaft and passes through a rotational center of the rotatable shaft and a circumferential center of each of the two power supply brushes.

12 Claims, 7 Drawing Sheets

BLOWER MOTOR FOR VEHICLE AIR CONDITIONING SYSTEM

CROSS REFERENCE TO RELATED APPLICATION

This application is based on and incorporates herein by reference Japanese Patent Application No. 2006-208093 filed on Jul. 31, 2006.

BACKGROUND OF THE INVENTION

1. Field of the Invention

The present invention relates to a blower motor for a vehicle air conditioning system.

2. Description of Related Art

In general, a motor main body of a blower motor for a vehicle air conditioning system is received in a motor holder, which is formed through a resin molding process. Radial ribs are formed along an inner surface of the motor holder to project radially inward. The radial ribs are engaged with an outer peripheral surface of a motor yoke of the motor main body to support the motor yoke, so that the motor main body is effectively supported by the motor holder (see, for example, Japanese Unexamined Patent Publication Number 2003-088039, Japanese Unexamined Patent Publication Number 2005-073322 and Japanese Unexamined Patent Publication Number 2000-341898).

Specifically, Japanese Unexamined Patent Publication Number. 2003-088039 discloses the holding structure of the motor, in which the motor main body is received in the motor holder.

Resilient projections are formed in the cylindrical inner peripheral surface of the motor holder at predetermined locations, respectively. The motor main body is supported while the resilient projections are engaged with the outer peripheral surface of the motor yoke.

Since the motor main body is supported by the resilient projections, which are formed in the inner peripheral surface of the motor holder, magnetic sound, which is caused by magnetic vibration of the yoke can be advantageously reduced, and there is no need to use a fixing member for stably holding the motor.

Japanese Unexamined Patent Publication Number 2005-073322 discloses the holding structure of the motor, in which the motor main body is received in the motor holder.

The projections are formed in the inner surface of the motor receiving portion of the motor holder to engage with the outer surface of the motor yoke to support the motor main body.

These projections are provided at an opening of the motor holder and at a location that is away from the opening of the motor holder on one axial side of a motor attachment flange, which is opposite from the opening of the motor holder.

In this way, a vibration transmission path between the opening of the motor holder and the flange is lengthened, so that the vibration is largely attenuated before reaching to the flange.

As described above, the projections, which are formed at predetermined locations in the motor holder, support the motor main body, and the vibration transmission path is lengthened. Therefore, the vibration can be advantageously reduced.

Japanese Unexamined Patent Publication Number 2000-341898 discloses the holding structure of the motor, in which the motor main body is received in the motor holder.

The projections are formed in the interior of the motor case. The projections are formed to support the motor yoke at four locations, i.e., a location of 45 degrees, a location of 135 degrees, a location of 225 degrees and a location of 315 degrees about the motor center relative to a circumferential center of a space between magnets. These locations are at anti-nodes of the vibration, and the vibration can be effectively reduced by fixing the positions of the anti-nodes. Thereby, the generation of the magnetic sound can be effectively limited.

As described above, in Japanese Unexamined Patent Publication Number 2003-088039, Japanese Unexamined Patent Publication Number 2005-073322 and Japanese Unexamined Patent Publication Number 2000-341898, the projections are provided in the supporting member, which receives the motor, and the projections are engaged with the outer peripheral surface of the motor yoke to hold the motor main body. Therefore, the vibration and magnetic sound, which are generated at the time of driving the motor, can be reduced.

Furthermore, the blower motor of the vehicle air conditioning system can be a motor of a left rotating type or a motor of a right rotating type.

In generally, the blower motor of the air conditioning system is located near a driver's seat in a passenger compartment. Thus, in many cases, there are required two types of units, i.e., a unit for a right-hand drive vehicle and a unit for a left-hand drive vehicle, which require opposite air blow directions, respectively.

Therefore, a rotational direction of a fan (i.e., a rotational direction of the motor of the air conditioning system) needs to be changed between these two types. Thus, one of the motor of a left rotating type and the motor of the right rotating type is selected depending on the type of the vehicle.

However, in the cases of Japanese Unexamined Patent Publication Number 2003-088039, Japanese Unexamined Patent Publication Number 2005-073322 and Japanese Unexamined Patent Publication Number 2000-341898, a common motor holder (motor case) is used for the motor of the right rotating type and the motor of the left rotating type to meet a demand of parts commonization. The positions of the projections, which are engaged with the motor yoke to support the motor main body, are kept the same for the motor of the right rotating type and for the motor of the left rotating type. Thus, the motor main body of the motor of the right rotating type and the motor main body of the motor of the left rotating type are held at the same position.

Therefore, the projections, which support the motor main body, are not provided to the best locations, which are best for both of the motor of the right rotating type and the motor of the left rotating type. Thus, when one of the motor main body of the right rotating type and the motor main body of the left rotating type is used, the vibration and noise may become relatively large in comparison to the other one.

SUMMARY OF THE INVENTION

The present invention addresses the above disadvantage. Thus, it is an objective of the present invention to provide a blower motor of a vehicle air conditioning system, which can alleviate vibration and noise at the time of driving the motor even in a case where either of a motor main body of a left rotating type and a motor main body of a right rotating type is used by providing a plurality of holding portions, which are engaged with a motor yoke to hold the motor main body, at appropriate locations in an inner peripheral surface of the motor holder.

To achieve the objective of the present invention, there is provided a blower motor for a vehicle air conditioning system. The blower motor includes a motor main body and a motor holder. The motor main body includes a motor yoke, an armature, a plurality of magnets and two power supply brushes. The armature is received in the motor yoke and has a rotatable shaft. The magnets are installed to an inner peripheral surface of the motor yoke. The power supply brushes are diametrically opposed to each other about a rotational center of the rotatable shaft. The motor holder receives the motor main body and includes a plurality of holding portions, which are provided to an inner peripheral surface of the motor holder and are engaged with an outer peripheral surface of the motor yoke to hold the motor main body. The plurality of holding portions is arranged symmetrically about a reference line, which is perpendicular to a rotational axis of the rotatable shaft and passes through the rotational center of the rotatable shaft and a circumferential center of each of the two power supply brushes.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

FIRST EMBODIMENT

A blower motor of a vehicle air conditioning system according to a first embodiment of the present invention will be described with reference to FIGS. 1 to 5B.

Figure 1:
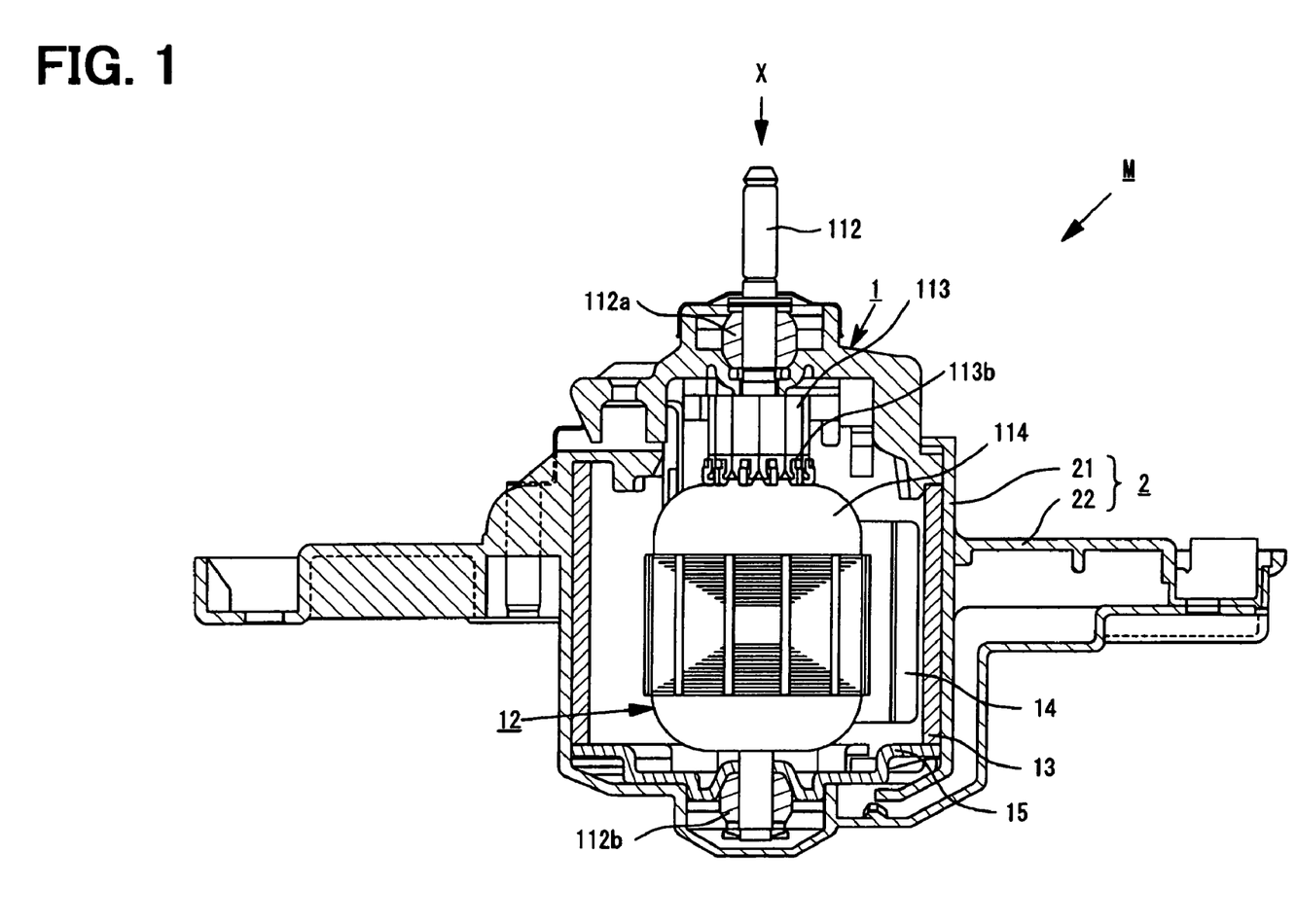
FIG. 1 is a descriptive view showing a motor of a vehicle air conditioning system according to a first embodiment of the present invention.

The blower motor M includes a motor main body 1 and a motor holder 2. The motor main body 1 includes an armature 12, a motor yoke 13, two magnets 14 and an end frame 15.

The armature 12 has a rotatable shaft 112, which forms a rotational axis of the armature 12. Opposed end portions of the rotatable shaft 112 are rotatably supported by bearings 112a, 112b, respectively.

The bearing 112a is placed at an upper side of FIG. 1 (an output side of the motor main body 1), and the bearing 112b is placed at a lower side of FIG. 1 (a side opposite from the output side of the motor main body 1).

A fan of a well known type (not shown) is fixed to the output side distal end portion of the rotatable shaft 112 (the side where the bearing 112a is located).

Furthermore, a commutator 113 is provided to one end side of the armature 12 (a side where the bearing 112a is located). Also, coils 114, which are connected to commutator segments 113b of the commutator 113, are wound around the armature 12.

The motor yoke 13 is a magnet supporting portion made of a generally cylindrical member. The magnets 14 are fixed to an inner peripheral wall surface of the motor yoke 13 in such a manner that the magnets 14 are diametrically opposed to each other. Furthermore, the armature 12 is received in an interior of the motor yoke 13. An opening of the motor yoke 13, which is located on one axial side (side, which is opposite from the commutator 113 and at which the bearing 112b is located) of the motor yoke 13, is closed with the end frame 15.

The motor holder 2 is attached to an outer surface of the motor main body 1 (the motor yoke 13) and serves as a fixing member, which is used to install the motor main body 1 to a vehicle body. The motor holder 2 includes a tubular portion 21 and a flange 22.

The tubular portion 21 is a cylindrical member having a closed bottom and is installed to the outer surface of the motor main body 1 (the motor yoke 13).

Furthermore, the flange 22 is a member, which extends radially outward from the tubular portion 21 and is used to install the motor M to a predetermined part of the vehicle body.

Multiple ribs (holding portions or projections) 21a are provided to an inner peripheral wall surface of the tubular portion 21 to project radially inward toward a rotational center of the armature 12.

The ribs 21a engage the outer surface of the motor yoke 13, which receives the armature 12. The motor main body 1 is held by the motor holder 2 through the ribs 21a.

An uninterrupted gap is provided along the outer peripheral surface of the motor yoke 13 between each adjacent two of the plurality of holding portions, or ribs 21a, in a rotational direction of the shaft 112. The gap radially spaces the outer peripheral surface of the motor yoke 13 from the inner peripheral surface of the motor holder 2.

The locations and functions of the ribs 21a of the motor holder 2 will be described with reference to FIGS. 2 to FIG. 5B.

Figure 2:
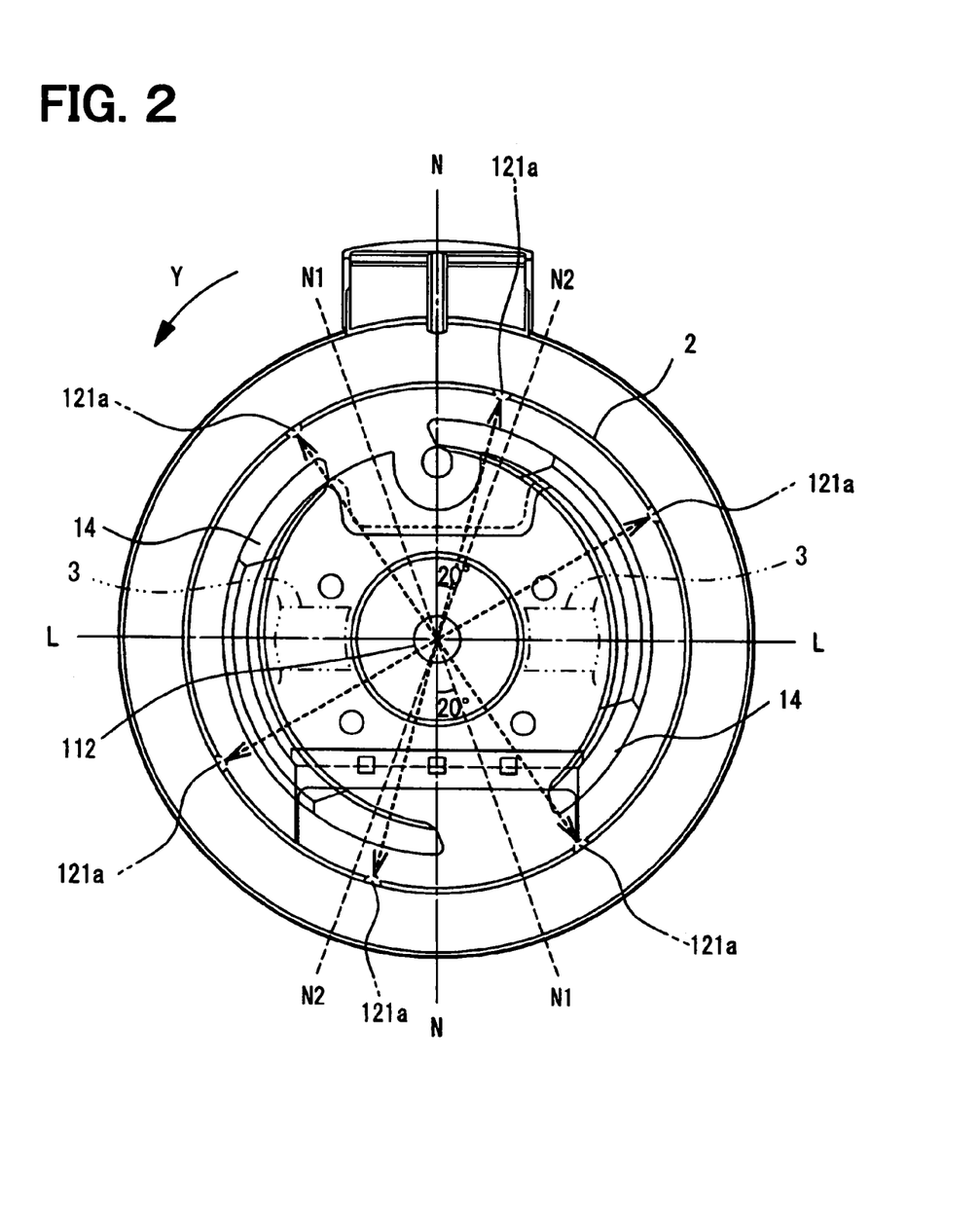
FIG. 2 is a descriptive view showing positions of magnets of the motor.

First, a reference line L, a neutral line N and locations of the magnets 14 will be described with reference to FIG. 2. FIG. 2 is the descriptive view seen from the output side (X direction side in FIG. 1) of the motor M. Furthermore, FIG. 2 is the descriptive view of a simplified form, from which some components that are not required for the description of the locations of the ribs 21a (ribs 121a) are eliminated for the sake of simplicity.

In the present embodiment, two power supply brushes 3 are arranged at corresponding locations, respectively, along the reference line L to diametrically oppose with each other about the rotatable shaft 112, i.e., are arranged in point symmetry about the rotatable shaft 112. Therefore, the reference line L is perpendicular to the rotational axis of the rotatable shaft 112 (i.e., the rotational axis of the armature 12) and passes through the rotational center of the rotatable shaft 112 and a circumferential center of each of the two power supply brushes 3, as shown in FIG. 2.

The magnets 14 are joined to the inner peripheral surface of the motor yoke 13 by, for example, an adhesive agent or a bonding agent. The locations of the magnets 14 are determined by the locations of the brushes 3. The locations of the magnets 14 and the locations of the brushes 3 are selected to minimize a cogging torque of the motor M. The locations of the magnets 14 and the locations of the brushes 3, which are selected to minimize the cogging torque, are known and are defined as follows.

The reference line L is a reference line of the brushes 3 and extends linearly through the center point (cross sectional center or rotational center of the rotatable shaft 112).

The neutral line N is a symmetrical center line, about which a symmetrical center line (hereinafter, referred to as a first center line N1) of the magnets 14 of the motor M of the left rotating type and a symmetrical center line (hereinafter, referred to as a second center line N2) of the magnets 14 of the motor M of the right rotating type are symmetrically arranged. Here, the symmetrical center line N1 is a line, about which the magnets 14 of the motor M of the left rotating type are symmetrically arranged. Also, the symmetrical center line N2 is a line, about which the magnets 14 of the motor M of the right rotating type are symmetrically arranged. In other words, the symmetrical line N1, N2 is a diametrical line, which is perpendicular to the rotational axis of the rotatable shaft 112 and passes through the rotational center of the rotatable shaft 112 and a circumferential center of each circumferential interval between the corresponding two magnets 14.

In order to minimize the cogging torque, the magnets 14 and the brushes 3 should be arranged such that the neutral line N intersects with the reference line L at the center point (the cross sectional center of the rotatable shaft 112) at a right angle (90 degree angle).

Specifically, FIG. 2 shows the magnets 14 of the motor M of the left rotating type. In this instance, in the case of the motor M of the left rotating type, the first center line N1 (i.e., locations of the magnets 14) is circumferentially displaced by about 20 degrees from the neutral line N (or about 70 degrees from the reference line L).

Similarly, in the case of the motor M of the right rotating type, the second center line N2 (i.e., the locations of the magnets 14) is circumferentially displaced by about 20 degrees from the neutral line N in a direction opposite from the first center line N1 of the motor M (see FIG. 2).

In the case where the magnets 14 are arranged in the above described manner, the best locations of the six ribs 21a may be selected in view of timing of generation of the cogging torque.

For the comparative purpose, locations of previously proposed six ribs 121a are indicated by dotted lines in FIG. 2 to compare with the locations of the the six ribs 21a of the present embodiment.

Here, a reference axis is set for the descriptive purpose. Specifically, for the descriptive purpose, it is assumed that a portion (an upper half) of the neutral line N, which extends radially upward from the cross sectional center of the rotatable shaft 112 in FIG. 2, is defined as a location of zero degree (initial location or reference axis), and a Y direction (the counterclockwise direction) in FIG. 2 is defined as a positive direction. In view of these, the locations of the ribs 121a about the cross sectional center of the rotatable shaft 112 are defied.

The six ribs 121a are arranged at a location of 35 degrees, a location of 115 degrees, a location of 165 degrees, a location of 215 degrees (a location of −145 degrees in a negative direction, i.e., the clockwise direction), a location of 295 degrees (a location of −65 degrees in the clockwise direction) and a location of 345 degrees (a location of −15 degrees), respectively, from the zero degree location (initial location). Here, a tolerance is ±5 degrees.

According to the previously proposed technique, the locations of the ribs 121a are defined in the above described manner. However, according to the present embodiment, in order to reduce the vibration and noise in both of the motor M of the right rotating type and the motor M of the left rotating type while using the common motor holder 2, the locations of the six ribs 121a are changed to those of the six ribs 21a shown in FIG. 3.

Figure 3:
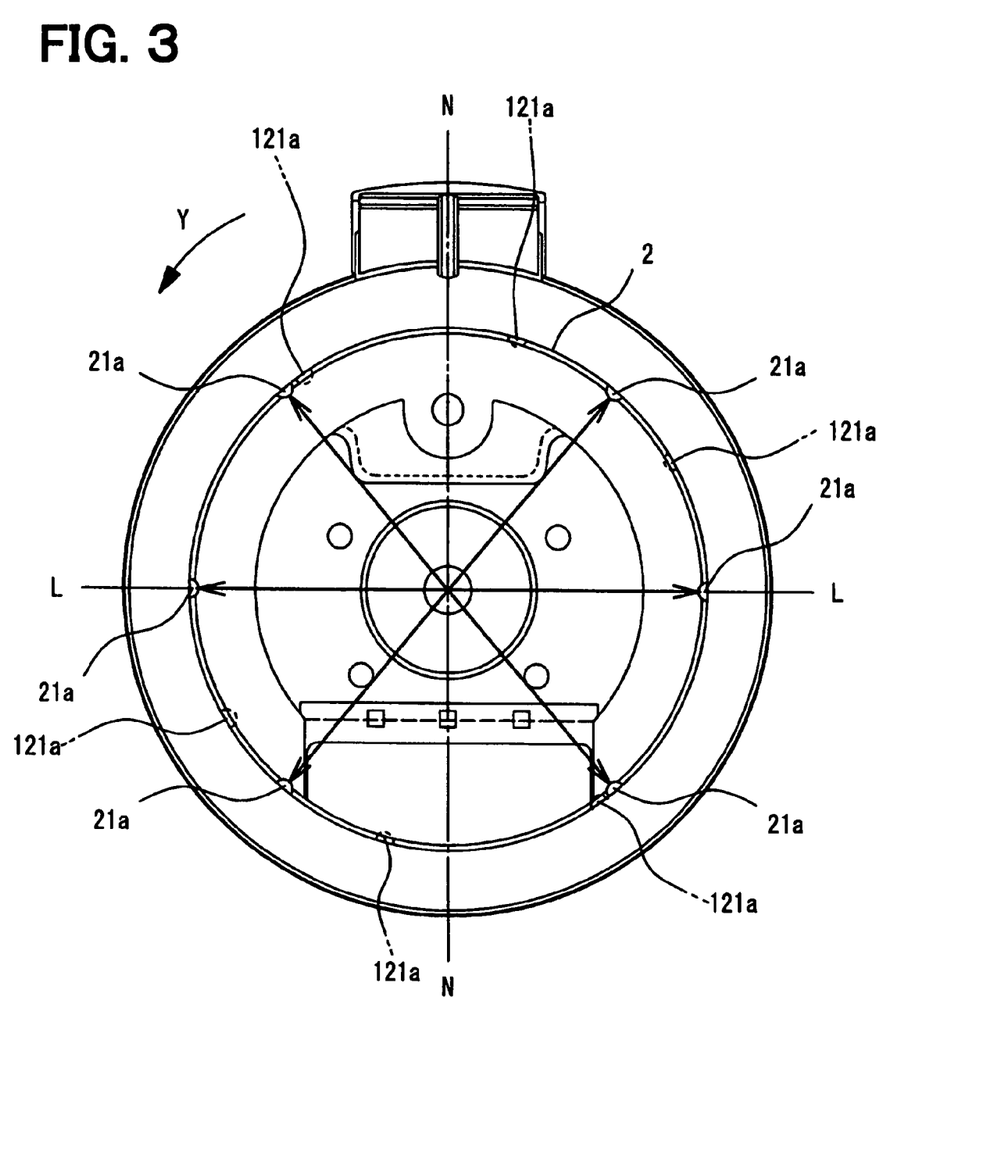
FIG. 3 is a descriptive view showing positions of ribs of the motor.

According to the present embodiment, the rib-to-rib pitches of the ribs 21a are the same as the rib-to-rib pitches of the ribs 121a.

The locations of the brushes 3 and the locations of the magnets 14 in FIG. 3 are similar to those shown in FIG. 2, so that the brushes 3 and the magnets 14 are omitted for the sake of simplicity in FIG. 3. Furthermore, in FIG. 3, the reference line L and the neutral line N are the same as those described above with reference to FIG. 2.

As shown in FIG. 3, the six ribs 21a of the present embodiment are circumferentially arranged one after another at a location of 40 degrees, a location of 90 degrees, a location of 140 degrees, a location of 220 degrees (a location of −140 degrees in the clockwise direction), a location of 270 degrees (a location of −90 degrees in the clockwise direction) and a location of 320 degrees (a location of −40 degrees in the clockwise direction), respectively, from the zero degree location (initial location). Here, a tolerance is ±5 degrees.

In other words, the ribs 21a are arranged symmetrically about the reference line L in such a manner that each of the ribs 21a is placed in one of an absolute angular range of 0 degree to 5 degrees (i.e., 0±5 degrees) relative to the reference line L and an absolute angular range of 45 degrees to 55 degrees (i.e., 50±5 degrees) relative to the reference line L. Unlike the asymmetrical arrangement of the ribs 121a of the previously proposed technique, the above described symmetrical arrangement of the ribs 21a about the reference line L according to the present embodiment enables effective use of the motor holder 2 for both of the motor M of the left rotating type and the motor M of the right rotating type to effectively limit the noise and the vibration, as will be described with reference to FIGS. 4A to 5B.

Next, with reference to FIGS. 4A to 5B, the reasons for the above settings of the locations of the ribs 21a will be described.

Figure 4A:
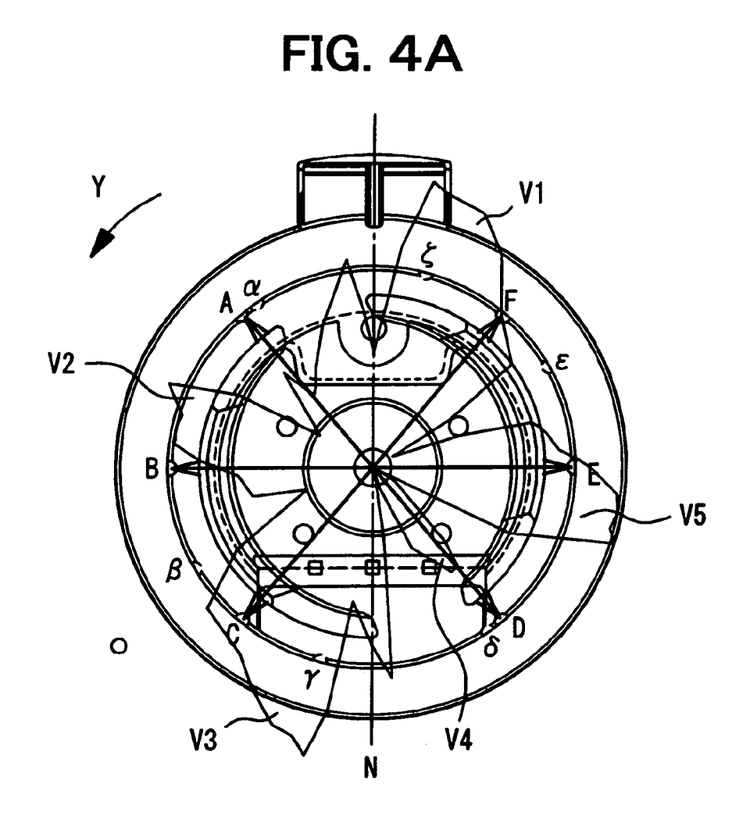
FIG. 4A is a descriptive view showing a vibrational state of the motor in a case of a left rotating type.
Figure 4B:
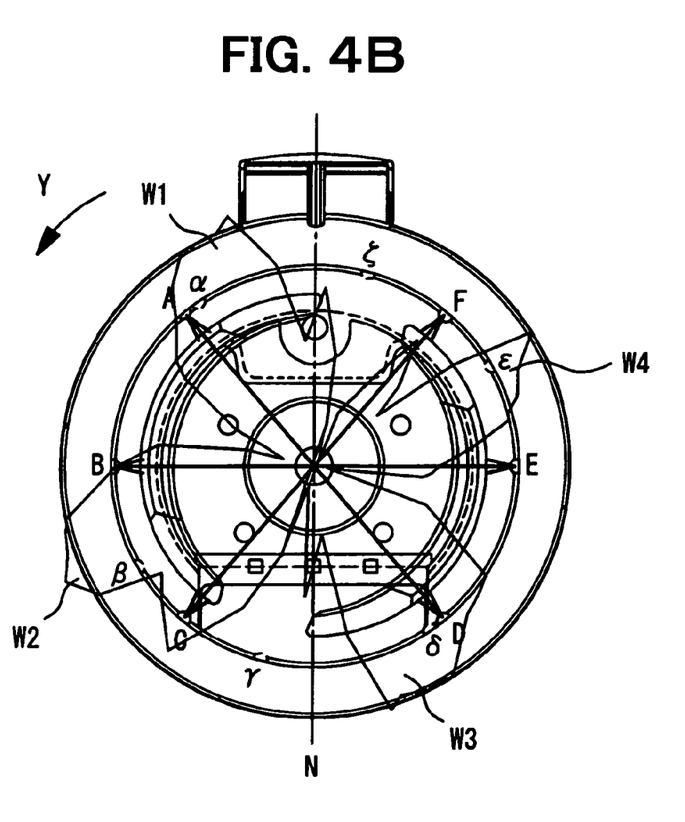
FIG. 4B is a descriptive view showing a vibrational state of the motor in a case of a right rotating type.

FIG. 4A is the descriptive view showing the vibrational state of the motor M of the left rotating type, and FIG. 4B is the descriptive view showing the vibrational state of the motor M of the right rotating type.

A degree of the vibration is indicated by a radial distance from the cross sectional center of the rotatable shaft 112. Specifically, when a vibration curve (vibration chart), which is indicated by a solid line in FIGS. 4A and 4B, shows a relatively large radial extent, the degree of vibration at that location is relatively large.

The locations of the six ribs 121a of the previously proposed technique are defined as follows. Here, the Y direction indicated in each of FIGS. 4A and 4B is considered as the positive direction. The reference axis is set in the same manner as that of FIGS. 2 and 3, and thereby the portion of the neutral line N, which extends radially upward from the cross sectional center of the rotatable shaft 112, is defined as the location of zero degree.

With respect to the ribs 121a of the previously proposed technique, the location of 35 degrees, the location of 115 degrees, the location of 165 degrees, the location of 215 degrees (the location of −145 degrees in the clockwise direction), the location of 295 degrees (the location of −65 degrees in the clockwise direction) and the location of 345 degrees (the location of −15 degrees in the clockwise direction) are denoted as a location α, a location β, a location γ, a location δ, a location ε and a location ζ, respectively.

Furthermore, the locations of the six ribs 21a of the present embodiment are defined as follows. Here, the Y direction indicated in each of FIGS. 4A and 4B is considered as the positive direction. The reference axis is set in the same manner as that of FIGS. 2 and 3, and thereby the portion of the neutral line N, which extends radially upward from the cross sectional center of the rotatable shaft 112, is defined as the location of zero degree.

With respect to the ribs 21a of the present embodiment, the location of 40 degrees, the location of the 90 degrees, the location of 140 degrees, the location of 220 degrees (the location of −140 degrees in the clockwise direction), the location of 270 degrees (the location of −90 degrees in the clockwise direction) and the location of 320 degrees (the location of −40 degrees in the clockwise direction) are denoted as a location A, a location B, a location C, a location D, a location E and a location F, respectively.

As shown in FIG. 4A, in the case of the motor M of the left rotating type, five vibrational peaks are observed at V1, V2, V3, V4, V5, respectively. The locations A to F are indicated with bold arrows over the vibrational peaks V1 to V5.

As shown in FIG. 4A, the vibrational peak V1 can be limited by placing the rib 21a in the location F. Similarly, the vibrational peak V2 can be limited by placing the rib 21a at the location B, and the vibrational peak V3 can be limited by placing the rib 21a at the location C. Furthermore, the vibrational peak V4 can be limited by placing the rib 21a at the location D, and the vibrational peak V5 can be limited by placing the rib 21a at the location E.

Similarly, as shown in FIG. 4B, in the case of the motor M of the right rotating type, four vibrational peaks are observed at W1, W2, W3, W4, respectively. The locations A to F are indicated with bold arrows over the vibrational peaks W1 to W4.

As shown in FIG. 4B, the vibrational peak W1 can be limited by placing the rib 21a at the location A. Similarly, the vibrational peak W2 can be limited by placing the two ribs 21a at the two locations B, C, respectively. The vibrational peak W3 can be limited by placing the rib 21a at the location D, and the vibrational peak W4 can be limited by placing the two ribs 21a at the two locations E, F, respectively.

As described above, when the six ribs 21a are arranged at the locations A to F, respectively, in the inner peripheral wall of the motor holder 2, the vibration (the vibrational peaks V1 to V5 and the vibrational peaks W1 to W4), which is generated at the time of driving the motor M of the right rotating type as well as at the time of driving the motor M of the left rotating type, can be advantageously limited in comparison to the previously proposed technique, in which the six ribs 121a are arranged at the locations α to ζ, respectively.

That is, the locations of the ribs 21a according to the present embodiment can effectively limit the vibration even when the motor M is rotated in the right direction or in the left direction.

Figure 5A:
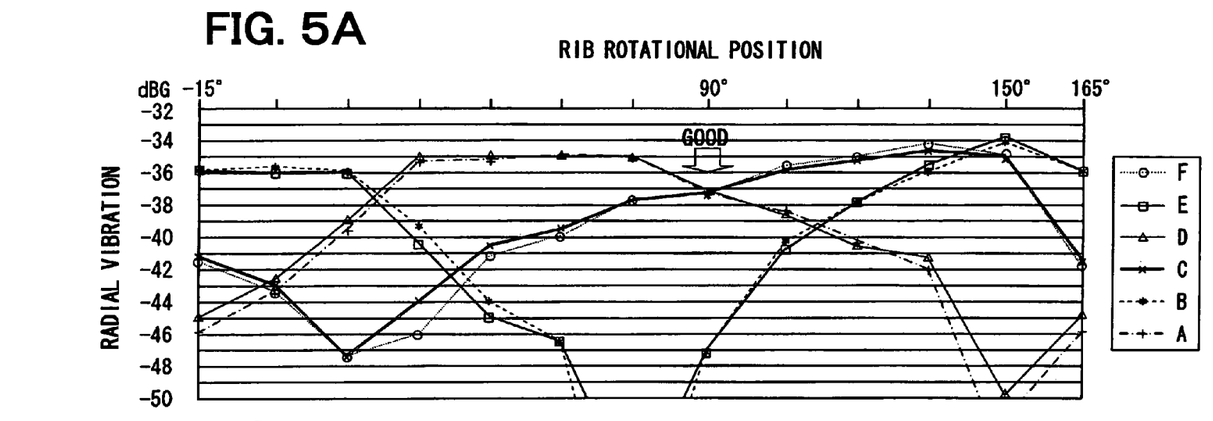
FIG. 5A is a diagram showing a result of CAE analysis of the motor in the case of the left rotating type.
Figure 5B:
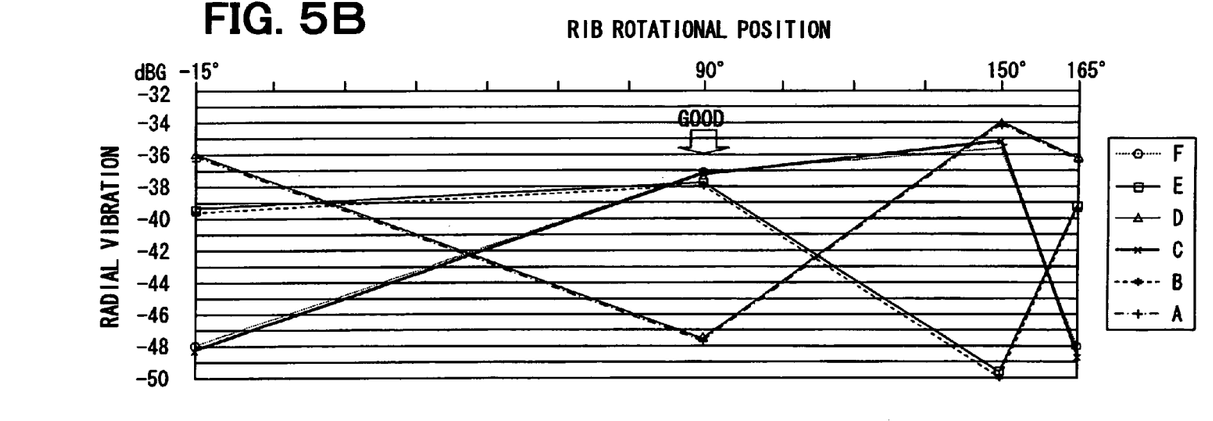
FIG. 5B is a diagram showing a result of CAE analysis of the motor in the case of the right rotating type.

FIGS. 5A and 5B show a result of CAE analysis.

In FIGS. 5A and 5B, the locations of the ribs are shifted from the locations α to ζ, respectively, by 15 degree intervals in the positive direction (the Y direction in FIGS. 2 to 4B), and the vibrational level in the radial direction is simulated.

In FIGS. 5A and 5B, the axis of abscissas indicates the location ζ, which is shifted by 15 degree intervals in the positive direction. Similar to the above ones, the reference axis is the portion of the neutral line N, which extends radially upward from the cross sectional center of the rotatable shaft 112, and which is defined as the location of zero degree.

That is, the origin of the axis of abscissas shows the location ζ, which is now held at the location of −15 degrees.

FIG. 5A shows the result of the analysis of the simulation of the motor M of the left rotating type, and FIG. 5B shows the result of the analysis of the simulation of the motor M of the right rotating type.

As shown in FIGS. 5A and 5B, the location, at which the vibration in the radial direction can be effectively reduced, is the location, at which the location ζ overlaps with the location B, i.e., the location ζ is placed at the location of 90 degrees.

Specifically, upon consideration of the best locations of the ribs without changing the rib-to-rib pitches of the ribs of the previously proposed technique, the locations A to F of the ribs 21a show the best result for limiting the vibration in both of the motor M of the left rotating type and the motor M of the right rotating type. By limiting the above vibration, the noise generated at the time of driving the motor M can be also advantageously reduced.

SECOND EMBODIMENT

Next, a second embodiment of the present invention will be described with reference to FIGS. 6 to 7B.

In the second embodiment, components similar to those of the first embodiment are indicated by the same numerals and will not be described further for the sake of simplicity.

In the first embodiment, the locations of the ribs are changed without changing the the rib-to-rib pitches of the previously proposed technique. However, in the second embodiment, the rib-to-rib pitches are also changed.

Figure 6:
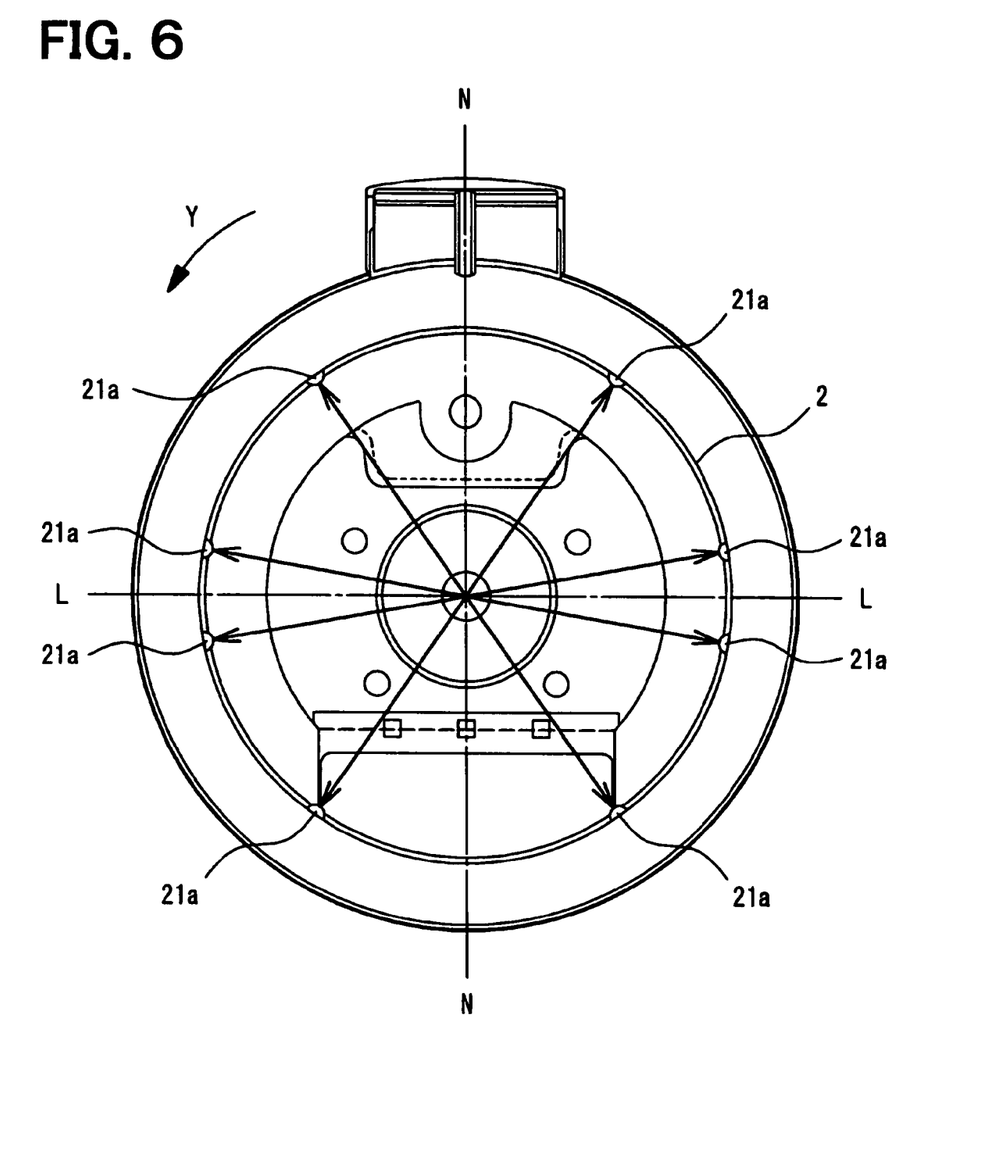
FIG. 6 is a descriptive view showing a motor of a vehicle air conditioning system according to a second embodiment of the present invention.

As shown in FIG. 6, eight ribs 21a are formed in the second embodiment.

The eight ribs 21a are arranged one after another along the inner peripheral wall of the motor holder 2 at a location of 35 degrees, a location of 80 degrees, a location of 100 degrees, a location of 145 degrees, a location of 215 degrees (a location of −145 degrees in the clockwise direction), a location of 260 degrees (a location of −100 degrees in the clockwise direction), a location of 280 degrees (a location of −80 degrees in the clockwise direction) and a location of 325 degrees (a location of −45 degrees in the clockwise direction), respectively from the zero degree location (initial location). Here, a tolerance is ±5 degrees.

In other words, the ribs 21a are arranged symmetrically about the reference line L in such a manner that each of the ribs 21a is placed in one of an absolute angular range of 5 degree to 15 degrees (i.e., 10±5 degrees) relative to the reference line L and an absolute angular range of 50 degrees to 60 degrees (i.e., 55±5 degrees) relative to the reference line L in FIG. 6.

Figure 7A:
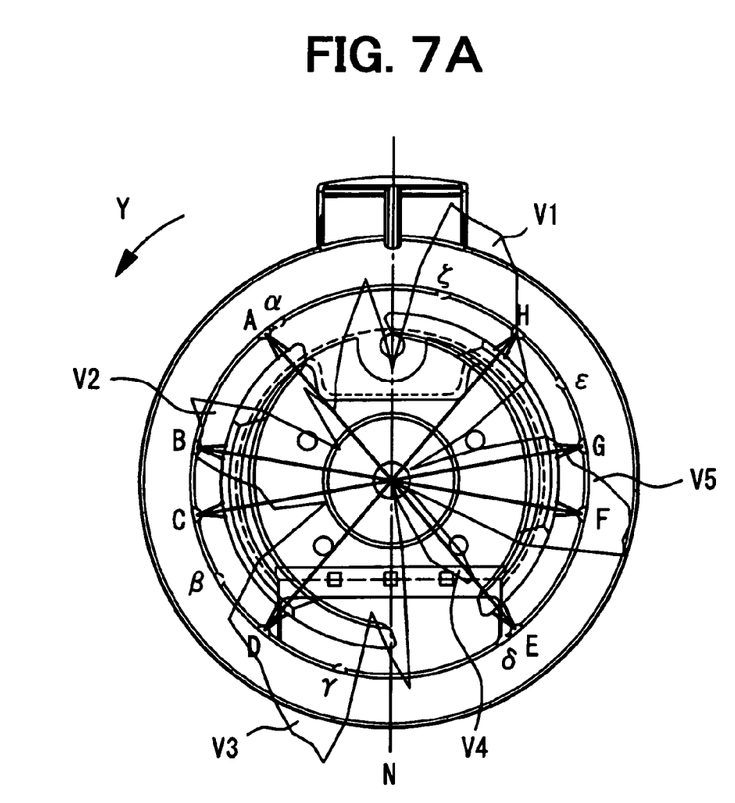
FIG. 7A is a descriptive view showing a vibrational state of the motor of the second embodiment in a case of a left rotating type.
Figure 7B:
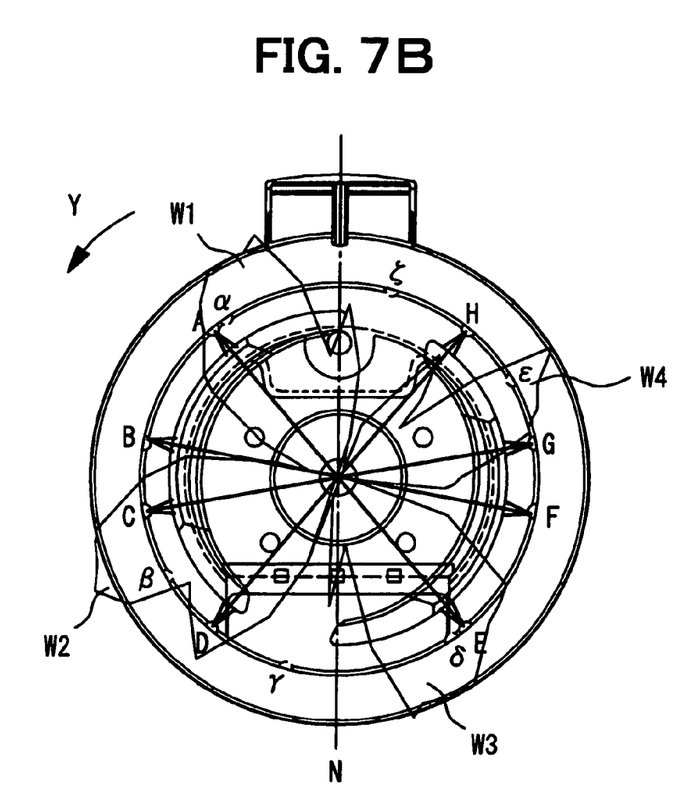
FIG. 7B is a descriptive view showing a vibrational state of the motor of the second embodiment in a case of a right rotating type.

FIG. 7A is the descriptive view showing the vibrational state of the motor M of the left rotating type, and FIG. 7B is the descriptive view showing the vibrational state of the motor M of the right rotating type.

Furthermore, the locations of the eight ribs 21a of the present embodiment are defined as follows. Here, the Y direction indicated in each of FIGS. 7A and 7B is considered as the positive direction.

The location of 35 degrees, the location of 80 degrees, the location of 100 degrees, the location of 145 degrees, the location of 215 degrees (the location of −145 degrees in the clockwise direction), the location of 260 degrees (the location of −100 degrees in the clockwise direction), the location of 280 degrees (the location of −80 degrees in the clockwise direction) and the location of 325 degrees (the location of −45 degrees in the clockwise direction) are denoted as a location A, a location B, a location C, a location D, a location E, a location F, a location G and a location H, respectively.

As shown in FIG. 7A, the vibrational peak V1 can be limited by placing the rib 21a in the location H. Similarly, the vibrational peak V2 can be limited by placing the rib 21a at the location B, and the vibrational peak V3 can be limited by placing the rib 21a at the location D. Furthermore, the vibrational peak V4 can be limited by placing the rib 21a at the location E, and the vibrational peak V5 can be limited by placing the two ribs 21a at the locations F, G, respectively.

Similarly, the vibrational peak W1 can be limited by placing the rib 21a at the location A. Furthermore, the vibrational peak W2 can be limited by placing the two ribs 21a at the two locations C, D, respectively. The vibrational peak W3 can be limited by placing the rib 21a at the location E, and the vibrational peak W4 can be limited by placing the two ribs 21a at the two locations G, H, respectively.

As described above, when the eight ribs 21a are arranged at the locations A to H, respectively, in the inner peripheral wall of the motor holder 2, the vibration (the vibrational peaks V1 to V5 and the vibrational peaks W1 to W4), which is generated at the time of driving the motor M of the right rotating type as well as at the time of driving the motor M of the left rotating type, can be advantageously limited. That is, the locations of the ribs 21a according to the present embodiment can effectively limit the vibration even when the motor M is rotated in the right direction or in the left direction. By limiting the vibration in the above described manner, the noise generated at the time of driving the motor M can be also advantageously reduced.

Additional advantages and modifications will readily occur to those skilled in the art. The invention in its broader terms is therefore not limited to the specific details, representative apparatus, and illustrative examples shown and described.

What is claimed is:

1. A blower motor for a vehicle air conditioning system, comprising:
    a motor main body that includes:
    a motor yoke;
    an armature that is received in the motor yoke and has a rotatable shaft;
    a plurality of magnets that are installed to an inner peripheral surface of the motor yoke;
    two power supply brushes that are diametrically opposed to each other about a rotational center of the rotatable shaft; and
    a motor holder that receives the motor main body and includes a plurality of holding portions, which are provided to an inner peripheral surface of the motor holder and are engaged with an outer peripheral surface of the motor yoke to hold the motor main body, wherein
    the plurality of holding portions is arranged generally symmetrically about a reference line, which is perpendicular to a rotational axis of the rotatable shaft and passes through the rotational center of the rotatable shaft and a circumferential center of each of the two power supply brushes, and
    an uninterrupted gap is provided along the outer peripheral surface of the motor yoke between each adjacent two of the plurality of holding portions in a rotational direction of the rotatable shaft to radially space the outer peripheral surface of the motor yoke from the inner peripheral surface of the motor holder.

2. The blower motor according to claim 1, wherein each of the plurality of holding portions is placed in one of:
    an absolute angular range of 0 degrees to 5 degrees relative to the reference line; and
    an absolute angular range of 45 degrees to 55 degrees relative to the reference line.

3. The blower motor according to claim 1, wherein at least two of the plurality of holding portions is arranged symmetrically about the reference line such that each of the at least two of the plurality of holding portions is placed within an absolute angular range of 5 degrees to 15 degrees relative to the reference line.

4. The blower motor according to claim 1, wherein at least two of the plurality of holding portions is arranged symmetrically about the reference line such that each of the at least two of the plurality of holding portions is placed within an absolute angular range of 50 degrees to 60 degrees relative to the reference line.

5. The blower motor according to claim 1, wherein each of the plurality of holding portions is placed in one of:
    an absolute angular range of 5 degrees to 15 degrees relative to the reference line; and
    an absolute angular range of 50 degrees to 60 degrees relative to the reference line.

6. The blower motor according to claim 1, wherein each of the plurality of holding portions is formed as a projection, which projects radially inwardly from the inner peripheral surface of the motor holder.

7. The blower motor according to claim 1, wherein the plurality of magnets includes two magnets.

8. The blower motor according to claim 7, wherein a diametrical line, which is perpendicular to the rotational axis of the rotatable shaft and passes through the rotational center of the rotatable shaft and a circumferential center of each circumferential interval between the two magnets, is circumferentially displaced from the reference line by about 70 degrees.

9. The blower motor according to claim 8, wherein the plurality of holding portions includes six holding portions, which are circumferentially arranged one after another at a location of 40 degrees ±5 degrees, a location of 90 degrees ±5 degrees, a location of 140 degrees ±5 degrees, a location of 220 degrees ±5 degrees, a location of 270 degrees ±5 degrees and a location of 320 degrees ±5 degrees, respectively, from a predetermined initial location, which is circumferentially displaced by 90 degrees from the reference line.

10. The blower motor according to claim 8, wherein the plurality of holding portions includes eight holding portions, which are circumferentially arranged one after another at a location of 35 degrees ±5 degrees, a location of 80 degrees ±5 degrees, a location of 100 degrees ±5 degrees, a location of 145 degrees ±5 degrees, a location of 215 degrees ±5 degrees, a location of 260 degrees ±5 degrees, a location of 280 degrees ±5 degrees and a location of 325 degrees ±5 degrees, respectively, from a predetermined initial location, which is circumferentially displaced by 90 degrees from the reference line.

11. The blower motor according to claim 1, wherein the plurality of holding portions does not project radially inward from the inner peripheral surface of the motor yoke.

12. The blower motor according to claim 1, wherein:
    the plurality of magnets includes first and second magnets; and
    the reference line is circumferentially displaced about 110 degrees from an imaginary line, which is perpendicular to the rotational axis of the rotatable shaft and extends through a circumferential center of a gap circumferentially defined between the first magnet and the second magnet.

* * * * *